(12) United States Patent
Hayami et al.

(10) Patent No.: US 6,611,650 B2
(45) Date of Patent: Aug. 26, 2003

(54) SILICA OPTICAL FIBER

(75) Inventors: Hiroyuki Hayami, Itami (JP); Terunobu Iio, Itami (JP); Toshikazu Gozen, Itami (JP); Hirokazu Kuzushita, Itami (JP); Michitsugu Mori, Yokohama (JP); Takashi Okamura, Yokohama (JP); Shuichi Ohmori, Yokohama (JP)

(73) Assignee: Mitsubishi Cable Industries, Ltd., Amagasaki (JP)

( * ) Notice: Subject to any disclaimer, the term of this patent is extended or adjusted under 35 U.S.C. 154(b) by 215 days.

(21) Appl. No.: 09/925,678

(22) Filed: Aug. 9, 2001

(65) Prior Publication Data

US 2002/0039477 A1 Apr. 4, 2002

(30) Foreign Application Priority Data

Aug. 10, 2000 (JP) .................................... 2000-243393

(51) Int. Cl.$^7$ ................................................. G02B 6/00
(52) U.S. Cl. ....................................................... 385/142
(58) Field of Search ................................. 385/123, 141, 385/142, 144

(56) References Cited

FOREIGN PATENT DOCUMENTS

| EP | 0 590 199 A1 | | 4/1994 |
| JP | 1 212244 | | 8/1989 |
| JP | 5-147966 | * | 6/1993 |
| JP | 8-9489 | * | 1/1996 |

* cited by examiner

*Primary Examiner*—Javaid H. Nasri
(74) *Attorney, Agent, or Firm*—Leydig, Voit & Mayer, Ltd.

(57) ABSTRACT

A silica optical fiber is provided, which contains a pure-silica core and a cladding layer formed on the pure-silica core, wherein the pure-silica core contains a C element and has a content of elements belonging to the third period-the seventh period of the periodic table, except Si element that constitutes the quartz structure, of not more than 100 ppm. The present invention can provide a silica optical fiber superior in the resistance to high energy electromagnetic waves such as UV light and γ-rays.

4 Claims, No Drawings

SILICA OPTICAL FIBER

TECHNICAL FIELD OF THE INVENTION

The present invention relates to a silica optical fiber, particularly to a silica optical fiber superior in resistance to high energy.

BACKGROUND OF THE INVENTION

In recent years, an optical fiber scope is frequently used for observation and checkup of places to which human or a camera cannot have access, such as a nuclear power plant, inside of a blast furnace, a boiler of power plants and the like. An optical fiber scope generally consists of an image fiber, an objective lens, an eyepiece, a light guide, and the like.

The image fiber consists of from thousands to tens of thousands of pixel fibers integrated by alignment, and transmits images formed on a fiber end by the lens to the other end upon decomposition of the images into each pixel fiber. The image fiber includes a multiple type fiber and a bundle type fiber. The multiple type fiber includes a number of aligned pixel fibers that are integrated by melting and drawing, thus forming a common clad. In contrast, the bundle type fiber includes a number of constituent fibers that are fixed by adhesion on both ends.

The optical fiber scope is used under the above-mentioned severe conditions. Particularly in a nuclear power plant where a high-energy electromagnetic wave irradiation of γ-ray is inevitable, pure silica is generally used as the core material of an image fiber, because it is superior in resistance to high energy. Due to the superior characteristics of the resistance to high energy, moreover, a silica optical fiber is also used for transmitting electromagnetic waves such as UV light and waves having shorter wavelengths such as X-ray.

However, the resistance to high energy of conventional silica optical fibers has not been improved to a sufficient level, and there have been ongoing attempts to improve resistance of silica optical fibers to high energy.

The present inventors have tried to improve optical fibers in the resistance to ultraviolet light by making the core of a silica optical fiber contain F element and OH group and removing Cl element from the core, as disclosed in JP-A-5-147966 (JP-B-8-9489), though sufficient effect has not been achieved.

Based on such results, the present inventors have noted completely different effects provided by the F element and the Cl element in radiation resistance and resistance to UV light, despite the fact that these elements fall under the seventh group in the periodic table, and acquired a completely new conception that the period of the element contained in the pure silica core material may be deeply involved in the resistance to high energy.

It is therefore an object of the present invention to provide a silica optical fiber superior in radiation resistance and having resistance to high energy of the light in the ultraviolet region, particularly to the light in the shorter wavelength ultraviolet region, specifically in an X-ray region.

SUMMARY OF THE INVENTION

The present invention is based on the finding that a pure-silica containing Cl element is markedly inferior to that containing F element in the resistance to high energy of ultraviolet radiation and γ-ray radiation because, in addition to the difference from Si element in the electronegativity and the difference in the atomic radius from the Si element or oxygen (O) element, the Cl element basically has a $3d$ orbital or $4s$ orbital that permits electrons in the ground state to easily transit to the $3d$ or $4s$ orbital upon application of an energy, thus producing an excited state, and easily becomes a valence state such as trivalence, pentavalence and heptavalence, producing many radicals. From this finding, the present inventors have considered that the changes in valence due to high energy irradiation may cause a greater effect on the high energy resistance of quartz by not only the F element and the Cl element, but by the elements belonging to the first period-second period and non-metallic elements belonging to the third period-seventh period.

Further studies based on the above-mentioned consideration have led to the following conclusion. That is, the major differences between the elements belonging to the third period-seventh period, as represented by the Cl element, and the elements belonging to the first period-second period, as represented by the F element, are that the elements belonging to the third period-seventh period have any of the factors of (1) a $3d$ orbital or $4s$ orbital that permits electron(s) in the ground state to easily transit to the $3d$ or $4s$ orbital upon application of a large external energy, such as γ-ray and UV light, thus producing an excited state, (2) a small difference in the electronegativity from Si element, and (3) a greater difference in atomic radius from Si element or oxygen element. Because they possess any of these elements (1)–(3), the elements belonging to the third period-the seventh period are considered to be easily activated when subjected to a large external energy and easily destroy a quartz structure, as compared to the elements belonging to the first period-second period.

Because the elements belonging to the first period-second period, particularly C element, show an extremely small difference in the atomic radius from the other elements belonging to the first period-second period, when they are introduced into the quartz structure and an Si—C bond or C—O bond is produced upon supplementation of radicals, the occurrence of the defects of the quartz structure, such as distortion and breakage of bond by a large external energy (e.g., γ-ray, UV light and the like), is suppressed, whereby resistance to the high energy of quartz is considered to be remarkably improved.

Based on these new findings, the present invention provides a silica optical fiber characterized by the following.

(1) A silica optical fiber comprising a pure-silica core and a cladding layer formed on the pure-silica core, wherein the pure-silica core comprises a C element and has a content of elements belonging to the third period-the seventh period of the periodic table, except an Si element that constitutes the quartz structure, of not more than 100 ppm.

(2) The silica optical fiber of the above-mentioned (1), wherein the content of the C element is 10 ppm–500 ppm.

(3) The silica optical fiber of the above-mentioned (1), wherein the pure-silica core further comprises an F element and/or an OH group.

(4) The silica optical fiber of above-mentioned (3), wherein the content of the F element and/or the OH group is not more than 5000 ppm.

DETAILED DESCRIPTION OF THE INVENTION

The present invention has been made based on the aforementioned new findings. In the silica optical fiber of the present invention, the content of the elements belonging to the third period-seventh period (except the Si element constituting the quartz structure) in the pure-silica core is set for not more than 100 ppm, and the C element is contained in the pure-silica core, thereby improving the radiation resistance, and the resistance to electromagnetic waves in the ultraviolet region and the region of shorter wavelengths (e.g., X-ray), namely, high energy resistance.

According to the present invention, an F element and/or an OH group are/is preferably contained in the pure-silica core. When, for example, an F element is contained, it reacts with radicals to produce a relatively stable chemical structure such as Si—F. When an OH group is contained, it reacts with radicals to produce a relatively stable chemical structure such as Si—OH. When the F element and/or OH group are/is contained, therefore, the high energy resistance can be further improved due to the mutual action with the aforementioned stable structure provided by the introduction of the C element.

When one of the OH group and F element is to be contained along with the C element, it is preferably the F element, which becomes more effective when combined to the C element. In particular, when the radiation resistance at a wavelength shorter than the visible region is desired, an OH group does not need to be contained. The F element can be contained by using a fluorine compound such as $SiF_4$, $CF_4$, $C_2F_6$, $BF_3$ and the like, which are free of an element of the third period other than Si element, relative to the silicon compound, which is a main starting material of the quartz structure to be mentioned later. When a fluorine compound containing an element belonging to the third period-seventh period, such as $SF_6$ and $PF_6$, is used, the content of the elements belonging to the third period-seventh period is increased, which is not preferable.

The method for producing the silica optical fiber of the present invention is explained in the following. The silica optical fiber of the present invention can be obtained by, for example, preparing a preform to be the base material and fiber-drawing this preform. The preform can be fiber-drawn by a known method comprising softening a preform by heating and drawing it. The preform can be obtained by, for example, forming a doped-silica glass to be a cladding layer on a pure-silica glass rod to be a core, or by inserting a pure-silica glass rod to be a core into a tube in which a doped-silica glass to be a cladding layer has been formed, and preferably removing partially or entirely the outermost tube layer by, for example, a fire polishing method.

The pure-silica glass rod (pure-silica core rod) to be the core of a silica optical fiber can be prepared according to the VAD method by, for example, hydrolyzing a silicon compound (the main material) with oxygen and hydrogen, depositing a synthetic silica particulate to form a porous silica, and heat-melting the same for vitrification (dope element can be added during deposition or sintering), or according to the plasma method for direct vitrification of a silicon compound (the main material) and a dopant.

For preparation of the above-mentioned pure-silica glass rod, the silicon compound and dopant, and the method such as the VAD method and plasma method should be selected in such a manner that the content of the element belonging to the third period-seventh period is not more than 100 ppm, and a C element, more conveniently an F element and/or an OH group are/is contained. Specifically, when tetramethoxysilane ($Si(OCH_3)_4$), tetraethoxysilane ($Si(OC_2H_5)_4$) or methyltrimethoxysilane ($CH_3Si(OCH_3)_3$) is used as the silicon compound and a fluorine compound such as $SiF_4$, $CF_4$, $C_2F_6$ and $BF_3$ is used as the dopant, the F element and the C element can be contained. Moreover, by employing the VAD method that uses an oxyhydrogen flame for heating, the OH group can be contained.

In the present invention, when the content of the C element is too high, the transmittance becomes low and when it is too low, the amount of oxygen in the pure-silica glass network structure becomes in excess to produce ≡Si—O—O—Si≡ bond in a great amount. As a result, a great absorption by high-energy irradiation is caused, lowering the radiation resistance. Therefore, the content of the C element is preferably 10–500 ppm, more preferably 10–200 ppm. The content of the C element can be controlled by, for example, adjusting the amount of oxygen during deposit, or adjusting the amount of oxygen flown in a temperature elevating state before sintering in a sintering apparatus.

The content of the F element and/or OH group is not more than 5000 ppm, preferably 100–3000 ppm.

When the content of the F element is too high, the refractive index of the core member becomes low, which makes the difference in refraction between the core and the cladding too small, and when it is too low, the effect of the high energy resistance becomes weak. Therefore, the content of the F element (simple substance) is preferably 100–2000 ppm. When the content of the OH group is too high, ≡Si—O deficiency occurs by irradiation to make the effect of the high energy resistance weak, and when it is too low, it tends to aggravate the initial transmission property particularly in the ultraviolet region. For a use other than in the ultraviolet region, an OH group does not need to be particularly contained. Therefore, the content of the OH group (simple substance) is preferably set for 0–500 ppm.

The content of the F element and OH group can be controlled by adjusting the amount of the dope element containing an F element, based on the dehydrating action of the F element, wherein a greater content of the F element means a lower content of the OH group.

The content of the C element, F element and OH group can be measured by a known method. In the case of the C element, for example, it can be measured by a combustion-infrared absorption analysis, in the case of the F element, it can be measured by an ion-selective electrode analysis, and in the case of the OH group, it can be measured by the analysis using an infrared spectrometer.

As mentioned above, a preform can be prepared by forming a doped-silica glass cladding layer. The layer of doped-silica glass can be formed by, for example, the CVD method, the MCVD method or the plasma method, using a mixed gas of $BCl_{13}$, $BF_3$, $SiCl_4$ and oxygen as starting material gases. Alternatively, the layer can be formed using a mixed gas of $BCl_{13}$, $SiF_4$ and oxygen or a mixed gas of $BF_3$, $BCl_3$, $SiF_4$ and oxygen, as a starting material gas.

The silica optical fiber of the present invention can be used as a single mode fiber or a multimode fiber. In addition, the silica optical fiber of the present invention can be used as a quartz bundle including bundled silica optical fibers or as a fiber constituting an image fiber.

EXAMPLES

The present invention is explained in detail by referring to examples. The present invention is not limited by these examples in any way.

Example 1

Using methyltrimethoxysilane ($CH_3Si(OCH_3)_3$) as a silicon compound and silicon tetrafluoride ($SiF_4$) as a fluorine compound, hydrogen gas was supplied at 60 Nl/hr, oxygen gas at 400 Nl/hr, methyltrimethoxysilane at 25 l/hr and silicon tetrafluoride at 0.44 g/hr to allow a combustion reaction. The generated synthetic silica particulates were deposited on a pure silica rod to give a body of porous silica having an outer diameter 60 mm×total length 230 mm. This body was sintered by heating at 1600° C. in a helium gas atmosphere at an atmospheric pressure to process it into rods having an outer diameter of 30 mm and a length of 120 mm.

The pure-silica core rod obtained above was subjected to componential analysis. As a result, the content of the element belonging to the third period-seventh period except the Si element was 0 ppm. The element belonging to the third period-seventh period was measured by fluorescent X-ray analysis, radioactivation analysis and ICP emission spectroscopic analysis.

In contrast, the content of the C element was 60 ppm, the content of the OH group was 150 ppm, and the content of the F element was 1200 ppm. The C element was measured by combustion-infrared absorption analysis and the F element was measured by ion-selective electrode analysis. In the case of the OH group, transmittance $T_1$ at a wavelength 2.73 nm was measured with an infrared spectrometer, and the absorption loss was calculated by the following formula 1, wherein $T_0$ is transmittance when the OH group content is 0 ppm, and L is a thickness of the above-mentioned pure-silica core rod.

$$\text{OH group content [ppm]} = \frac{1000}{L} \text{Log}_{10}\left(\frac{T_0}{T_1}\right) \quad (1)$$

A mixed gas of $BF_3$, $SiCl_4$ and oxygen was supplied into a pure-silica glass tube, and a layer of doped-silica glass (thickness 1.5 mm) was formed by the MCVD method. The pure-silica core rod obtained above was inserted to give a preform having a three-layer structure. An appropriate amount of the outermost layer of this preform was removed by the fire polishing method, and the resulting preform was heated at 2100° C. for fiber drawing to give a silica optical fiber of the present invention having an outer diameter of 250 μm (φ).

The silica optical fiber obtained above was tested for degradation caused by ultraviolet irradiation and γ-ray irradiation. The degradation caused by ultraviolet irradiation was examined by irradiation of UV light from a UV light source (deuterium lamp) for 10 hours. Then the transmittance [%] at 215 nm was calculated by the following formula 2. The power of outgoing light of the formula 2 was measured using an instantaneous measurement multisystem. The results are shown in Table 1.

$$\text{transmittance [\%]} = \frac{\text{power of outgoing UV light after 10 hours' irradiation}}{\text{power of outgoing UV light immediately after irradiation}} \quad (2)$$

The degradation due to γ-ray irradiation was determined by exposing the silica optical fiber having an irradiation length of 10 m and a total length of 25 m, which was obtained above, to γ-ray at a dose rate of $1\times10^6$ R/h for 50 hours and measuring the induced loss in the visible region. The induced loss (dB/km) at 550 nm is shown in Table 1.

Using an electron spin resonance (ESR) device, a number of the aforementioned pure-silica core fibers were exposed to γ-ray (irradiation length:40 mm) under the same conditions (dose rate $1\times10^6$ R/h, 50 hours), and the amount of E' quartz defect (≡Si) [$\times10^{15}$/g] generated then was measured. The results are shown in Table 1. A greater quartz defect value means a greater degradation at 215 nm by ultraviolet irradiation.

Example 2

In the same manner as in Example 1 except silicon tetrafluoride was supplied at 0.60 g/hr, a pure-silica core rod was prepared. The content of the elements belonging to the third period-seventh period in the pure-silica core rod prepared in this example except Si element was 0 ppm, the content of the C element was 40 ppm, the content of the OH group was 100 ppm, and the content of the F element was 1500 ppm. A number of such pure-silica core fibers were subjected to the γ-ray irradiation test in the same manner as in Example 1 using an electron spin resonance (ESR) device and the amount of quartz defect then was measured.

An F element doped cladding was then adhered to the pure-silica core rod prepared above by the plasma method to give a preform. This preform was heated at 2100° C. in the same manner as in Example 1 for fiber drawing to give a silica optical fiber having an outer diameter of 250 μm (φ), which was then subjected to the irradiation tests (γ-ray irradiation test and ultraviolet irradiation test) in the same manner as in Example 1.

Example 3

In the same manner as in Example 1 except that silicon tetrafluoride was supplied at 0.80 g/hr, a pure-silica core rod was prepared. The content of the element belonging to the third period-seventh period in the pure-silica core rod prepared in this example except Si element was 0 ppm, the content of the C element was 100 ppm, the content of the OH group was 80 ppm, and the content of the F element was 2000 ppm. A number of pure-silica core fibers were subjected to the γ-ray irradiation test using an electron spin resonance (ESR) device in the same manner as in Example 1, and the amount of quartz defect then was measured.

In the same manner as in Example 1 (MCVD method) and using the pure-silica core rod prepared above, a preform was produced. This preform was heated at 2100° C. for fiber drawing to give a silica optical fiber having an outer diameter of 250 μm (φ) which was then subjected to the irradiation tests (γ-ray irradiation test and ultraviolet irradiation test) in the same manner as in Example 1.

Example 4

Using methyltrimethoxysilane ($CH_3Si(OCH_3)_3$) and oxygen as a silicon compound and silicon tetrafluoride ($SiF_4$) as a fluorine compound, and according to a direct method by the argon plasma method, a pure-silica core rod having an outer diameter of 40 mm and a length of 150 mm was obtained. This pure-silica core rod was subjected to componential analysis. As a result, the content of the element belonging to the third period-seventh period except the Si element was 0 ppm, the content of the C element was 40 ppm, the content of the OH group was 0 ppm, and the content of the F element was 3500 ppm. A number of such pure-silica core fibers were subjected to the γ-ray irradiation test in the same manner as in Example 1 using an electron spin resonance (ESR) device and the amount of quartz defect then was measured.

The above-mentioned pure-silica core rod was drawn to 20 mm and prepared into a preform by the MCVD method in the same manner as in Example 1 for fiber drawing. The obtained fiber was subjected to the irradiation test (γ-ray irradiation in the same manner as in Example 1).

Example 5

In the same manner as in Example 1 except that the oxygen gas was set for 200 NL/hr, a silica fiber with pure-silica core and doped cladding of the present invention was prepared. In the same manner as in Example 1, the pure-silica core rod and fibers were respectively subjected to the componential analysis and γ-ray irradiation test using an electron spin resonance (ESR) device and measurement of the quartz defect then. The completed silica fiber was subjected to the irradiation tests (γ-ray irradiation test and ultraviolet irradiation test) as in Example 1. As a result of the componential analysis of the pure-silica core rod, the content of the element belonging to the third period-seventh period except the Si element was 0 ppm, the content of the C element was 300 ppm, the content of the OH group was 30 ppm, and the content of the F element was 3000 ppm.

Comparative Example 1

In the same manner as in Example 1 except that a sulfur hexafluoride ($SF_6$) was used as a fluorine compound, a fiber was prepared. In the same manner as in Example 1, the pure-silica core rod and fibers were respectively subjected to the componential analysis and γ-ray irradiation test using an electron spin resonance (ESR) device and measurement of the quartz defect then. The completed silica fiber was subjected to the irradiation test (γ-ray irradiation test) as in Example 1. As a result of the componential analysis of the pure-silica core rod, the content of sulfur (S element) which belongs to the third period-seventh period except the Si element was 190 ppm, and the content of the element belonging to the first period and the second period was 30 ppm for C element and 3900 ppm for F element.

Comparative Example 2

In the same manner as in Example 1 except that silicon tetrachloride ($SiCl_4$) was used as a silicon compound, a fiber was prepared. In the same manner as in Example 1, the pure-silica core rod and fibers were respectively subjected to the componential analysis and γ-ray irradiation test using an electron spin resonance (ESR) device and measurement of the quartz defect then. The completed silica fiber was subjected to the irradiation test (γ-ray irradiation test) as in Example 1. As a result of the componential analysis of the pure-silica core rod, the content of chlorine (Cl element) which belongs to the third period except the Si element and which belongs to the halogen group so does the F element was 330 ppm, and the content of the element belonging to the first period and the second period was 0 ppm for C element and 3000 ppm for F element.

Comparative Example 3

In the same manner as in Example 4 according to the argon plasma method except that silicon tetrachloride ($SiCl_4$) was used as a silicon compound and steam was added, a pure-silica core rod and then a preform were produced. This preform was subjected to fiber drawing. In the same manner as in Example 1, the pure-silica core rod and fibers were respectively subjected to the componential analysis and γ-ray irradiation test using an electron spin resonance (ESR) device and measurement of the quartz defect then. The completed silica fiber was subjected to the irradiation tests (γ-ray irradiation test and ultraviolet irradiation test) as in Example 1.

As a result of the componential analysis of the pure-silica core rod, the content of chlorine (Cl element) which belongs to the third period except the Si element and which belongs to the halogen group so does the F element was 110 ppm, and the content of the element belonging to the first period and the second period was 0 ppm for C element, 0 ppm for F element and the content of the OH element was 550 ppm.

TABLE 1

|  | Ex. 1 | Ex. 2 | Ex. 3 | Ex. 4 | Ex. 5 | Com. Ex. 1 | Com. Ex. 2 | Com. Ex. 3 |
| --- | --- | --- | --- | --- | --- | --- | --- | --- |
| 3rd period–7th period element (ppm) | 0 | 0 | 0 | 0 | 0 | S: 190 | Cl: 330 | Cl: 110 |
| C element (ppm) | 60 | 40 | 100 | 40 | 300 | 30 | 0 | 0 |
| OH group (ppm) | 150 | 100 | 80 | 0 | 30 | 0 | 0 | 550 |
| F element (ppm) | 1200 | 1500 | 2000 | 3500 | 3000 | 3900 | 3000 | 0 |
| UV transmittance [%] at 215 nm | 56 | 60 | 65 | — | 45 | — | — | 10 |
| E' quartz defect ($\times 10^{15}$/g) | 4.0 | 3.1 | 2.9 | 2.2 | 9.0 | 66 | 33 | 42 |
| Induced loss by γ-ray irradiation (dB/km) at 550 nm | 240 | 170 | 110 | 150 | 320 | 2300 | 2100 | 1900 |

EVALUATION

From the above-mentioned Table 1, it can be confirmed that the silica optical fiber of the present invention is superior in the resistance to degradation due to ultraviolet radiation and γ-ray. In other words, the silica optical fiber of the present invention is superior in high energy resistance.

As mentioned above, the present invention can provide a silica optical fiber superior in the resistance to high energy electromagnetic waves such as UV light and γ-rays. For example, when an image fiber and a bundle are constructed with the silica optical fiber of the present invention, a fiber scope and a bundle having a longer service life than conventional ones can be provided.

This application is based on a patent application No. 2000-243393 filed in Japan, the content of which is hereby incorporated by reference.

What is claimed is:

1. A silica optical fiber comprising a pure-silica core and a cladding layer formed on the pure-silica core, wherein the pure-silica core comprises a C element and has a content of elements belonging to the third period-the seventh period of the periodic table, except Si element that constitutes the quartz structure, of not more than 100 ppm.

2. The silica optical fiber of claim 1, wherein the content of the C element is 10 ppm–500 ppm.

3. The silica optical fiber of claim 1, wherein the pure-silica core further comprises an F element, an OH group or an F element and an OH group.

4. The silica optical fiber of claim 3, wherein the content of at least one of the F element and the OH group is not more than 5000 ppm.

* * * * *